United States Patent [19]

Veit et al.

[11] Patent Number: 5,275,273

[45] Date of Patent: Jan. 4, 1994

[54] TRACK INTERSECTION PIN GUIDE

[75] Inventors: Frank W. Veit, Ada; Ronald C. Ehlert, Wyoming; David H. Cotter, Coopersville, all of Mich.

[73] Assignee: Rapistan Demag Corporation, Grand Rapids, Mich.

[21] Appl. No.: 923,043

[22] Filed: Jul. 31, 1992

Related U.S. Application Data

[63] Continuation-in-part of Ser. No. 606,504, Oct. 31, 1990, Pat. No. 5,135,100.

[51] Int. Cl.⁵ .............................................. B65G 47/46
[52] U.S. Cl. ..................................... 198/370; 198/372
[58] Field of Search .............. 198/365, 370, 372, 362, 198/440, 456

[56] References Cited

U.S. PATENT DOCUMENTS

| | | |
|---|---|---|
| 126,106 | 4/1872 | Townsend . |
| 405,088 | 6/1889 | Ferguson . |
| 988,051 | 3/1911 | Vallarino . |
| 1,236,389 | 1/1914 | Augensen . |
| 2,318,221 | 5/1943 | Hayssen et al. . |
| 3,277,995 | 11/1966 | Seed . |
| 3,288,268 | 11/1966 | Fehely . |
| 3,361,247 | 1/1968 | Lauzon et al. . |
| 3,542,215 | 11/1970 | Fromme et al. . |
| 3,710,923 | 1/1973 | Fromme et al. . |
| 3,770,100 | 11/1973 | McCaul . |
| 3,771,648 | 11/1973 | Revuelta . |
| 3,780,850 | 12/1973 | McSwiggin . |
| 3,986,596 | 10/1976 | Hamilton . |
| 3,987,888 | 10/1976 | Wickam . |
| 4,003,465 | 1/1977 | Bauer . |
| 4,717,011 | 1/1988 | Yu et al. . |
| 4,732,259 | 3/1988 | Yu et al. . |
| 4,738,347 | 4/1988 | Brouwer et al. . |
| 4,884,677 | 12/1989 | Yu et al. . |
| 4,946,022 | 8/1990 | Davis et al. . |
| 4,971,190 | 11/1990 | Berends et al. . |
| 5,027,939 | 7/1991 | Kilper et al. ............... 198/365 |
| 5,038,912 | 8/1991 | Cotter ........................ 198/370 |
| 5,127,510 | 7/1992 | Cotter et al. .............. 198/372 |
| 5,131,522 | 7/1992 | Fujio ..................... 198/372 X |
| 5,135,100 | 8/1992 | Cotter et al. . |
| 5,167,315 | 12/1992 | Doane ..................... 198/370 X |

FOREIGN PATENT DOCUMENTS

0518399 12/1992 European Pat. Off. .

OTHER PUBLICATIONS

Drawing of a prior art track intersection pin guide ("Crossing Assembly 30""), Apr., 1990.

*Primary Examiner*—D. Glenn Dayoan
*Attorney, Agent, or Firm*—Price, Heneveld, Cooper, DeWitt & Litton

[57] ABSTRACT

A non-powered, self-position-adjusting track intersection pin guide, or switch, is provided having a plate member that pivots in the plane of the crossing guide tracks that move article diverter shoes of a positive displacement sortation conveyor in a predetermined manner relative to the supporting surface of the conveyor. The plate member pivots between a first position guiding the diverter shoe guide elements along a first path and a second position guiding the diverter shoe guide elements along a second path. The plate member includes first and second cam members defining first and second cam surfaces. First and second guiding surfaces are additionally defined on the plate member, whereby the cam surfaces are selectively positioned in the first and second paths for actuations by a guide element moving along the respective path in order to rotate the cam surfaces and the guiding surfaces about a common pivot in order to guide movement of the guide elements. The pivot is upstream of the first and second cam surfaces with respect to travel of the guide elements in order to provide switching between first and second positions through an extremely small arc of travel. The cam surfaces are positioned in the guide tracks in a manner that they are actuated by the guide bearing of the diverter shoes wherein the guiding surfaces are positioned to act on the much narrower guide pin of the diverter shoes. Each of the cam members includes an additional cam surface for actuation by the guide pin of the diverter shoes in order to actuate the plate between first and second positions in the event that a bearing is missing from the diverter shoes, or is malfunctioning.

24 Claims, 7 Drawing Sheets

TRACK INTERSECTION PIN GUIDE

CROSS REFERENCE TO RELATED APPLICATIONS

This application is a continuation-in-part of U.S. patent application Ser. No. 07/606,504 filed by David H. Cotter and Curtis E. LeMay filed Oct. 31, 1990 and now U.S. Pat. No. 5,135,100.

BACKGROUND OF THE INVENTION

This invention relates generally to the guiding of a diverting shoe or pallet pin track intersection in a conveyor used in article sorting systems.

Positive displacement sortation conveyors, also known as article sorters, are well-known in the art. These systems include an article conveyor capable of handling a large volume of articles such as boxes of various sizes and weights. Where only single sided sortation is required, the conveyor uses shoes, or pallets, which are attached to either side of the slatted surface sections of the conveyor. A control determines, according to article size, the correct number of shoes required to push the article off the conveyor and onto a sortation spur which is located on one side of the conveyor. As an article that is to be discharged approaches the sortation point, the control actuates a diverter switch to displace an appropriate number of shoes onto a diagonal guide track. A lateral force is applied to the side of the article by lateral displacement of the appropriate shoes, to push the article onto the sortation spur.

A problem arises, however, when alternative tracks are adjacent on opposite lateral sides of the conveyor system. This requires a crossing of the oppositely heading guide tracks associated with the adjacent spurs. A switching system is required at the point of guide track intersection to direct the shoes through the intersection so continued force is applied to the article pushing it along the desired path.

The prior art teaches conveyor systems, such as that shown by Lauzon et al. U.S. Pat. No. 3,361,247 which utilizes a crossover pin guide, or switch, permitting lateral transfer from either the left or right side of the conveyor. The crossover switch utilizes a base plate connected to a reactivating element which acts to deflect an oncoming cam roller. The base plate is pivoted to allow the cam roller to pass through the intersection. The switch provides a positive guard against the pin being inadvertently directed into the wrong track. After being pivoted to the alternative direction or track, the switch permitted the pin to pass through in addition to providing a positive guard against the pin being inadvertently directed into the other track. Lauzon et al. was an improvement over prior art systems because the energy required to shift the position of the switch was provided by motion of the oncoming pin from the approaching shoe, or pallet, without the use of solenoids or other powered operating devices.

SUMMARY OF THE INVENTION

The invention provides a non-powered, self-position-adjusting track intersection pin guide, or switch. According to a first aspect of the invention, a mechanical switch is provided having a plate member that pivots in the plane of the crossing guide tracks that move the article diverter shoes in a predetermined manner relative to the supporting surface of the conveyor. First and second cam members extend from the plate member defining first and second cam surfaces. The plate member further includes means defining first and second blocking surfaces thereon. The cam surfaces are positioned in the guide tracks in order to rotate the plate member between first and second positions in order to selectively position the blocking surfaces covering respective openings in the guide tracks. By combining the cam surfaces and blocking surfaces with a plate member to rotate about a common pivot, a pin guide is provided that is smooth and quiet in operation and is more durable and less prone to failure than prior art devices.

According to another aspect of the invention, the integral member is adapted to pivot between the first and second positions through a pivot angle that is less than half of the divert angle of the conveyor. In a preferred embodiment, the angle of travel of the integral member is 4.5 degrees. Because the extent of travel is small, it can be accommodated at a slower speed which ensures smooth and quiet travel as well as reduced wear on the components.

According to another aspect of the invention, the plate member is pivotally mounted by pivot means to pivot between first and second positions to selectively position the first and second blocking surfaces to guide a guide element of a diverting member along a respective guide track. The pivot means, according to this aspect of the invention, is upstream of the first and second cam surfaces with respect to travel of the guide elements. Such configuration accommodates switching between the first and second positions through an extremely small arc of travel.

According to a further aspect of the invention, a track intersection pin guide includes a pivotally mounted plate member generally in the plane of the guide tracks that guide the diverting member guide elements and having first and second cam members extending from the plate member defining first and second cam surfaces. Means are provided which define first and second blocking surfaces adapted to guiding the guide elements through a guide track intersection. According to this aspect of the invention, the first and second cam surfaces are positioned for actuation by the guide bearing of the guide element to rotate the plate member and position one of the blocking surfaces covering an opening in one guide track. The first and second blocking surfaces are positioned to block the guide pin of the guide element. This combination of the plate member being rotated in reaction to the guide element bearings while the diverting members being guided in reaction of the guide pins on the blocking surfaces, has been found to provide exceptional smooth and quiet operation while minimizing the arc through which the plate member must travel in order to switch the path along which the guide elements are guided.

According to yet another aspect of the invention, a track intersection pin guide includes a plate member generally in the plane of the guide tracks of the conveyor and first and second cam members extending from the plate member defining first and second cam surfaces positioned for actuation by the guide bearing of the guide element in order to pivot the plate member between first and second switch positions. The first and second cam members further define, respectively, third and fourth cam surfaces for actuation by a guide pin of a guide element in order to rotate the plate member between the first and second positions. Because the plate member can be rotated by either the bearing or the pin of a guide element, this provides a back-up actuation means. Should the bearing be missing or malfunctioning in the guide element of a particular diverting member, the more rigid permanent guide pin will still be capable of rotating the plate member between first and second positions by contacting the respective third or fourth cam surface.

These and other objects, advantages and features of this invention will become apparent upon review of the following specification in conjunction with the drawings.

BRIEF DESCRIPTION OF THE DRAWINGS

FIG. 13b illustrates the position of the moveable integral member in FIG. 13a;

FIG. 14b illustrates the position of the moveable integral member in FIG. 14a.

DESCRIPTION OF THE PREFERRED EMBODIMENT

Figure 1:
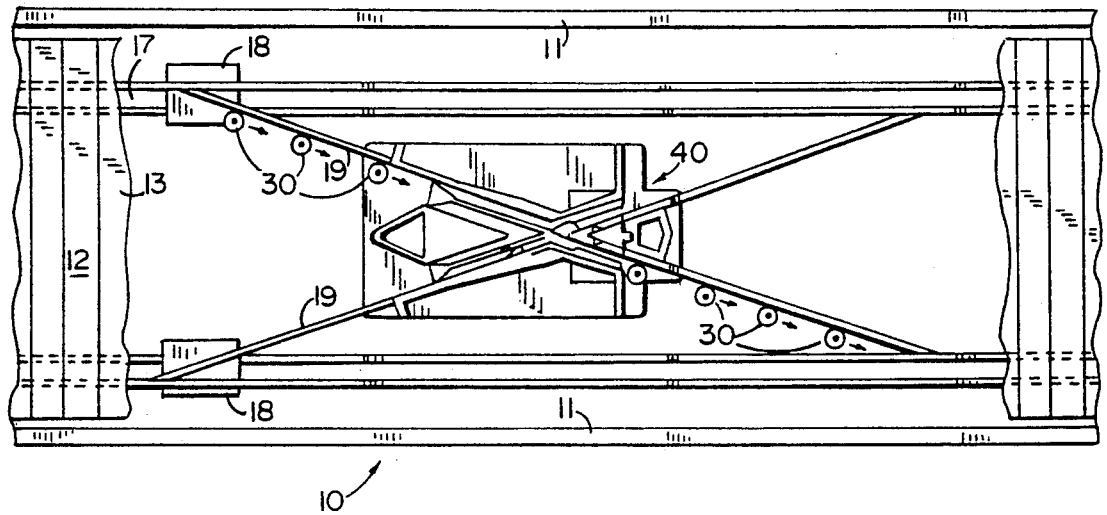
FIG. 1 is a top plan view of an article conveyor system according to the invention.
Figure 2:
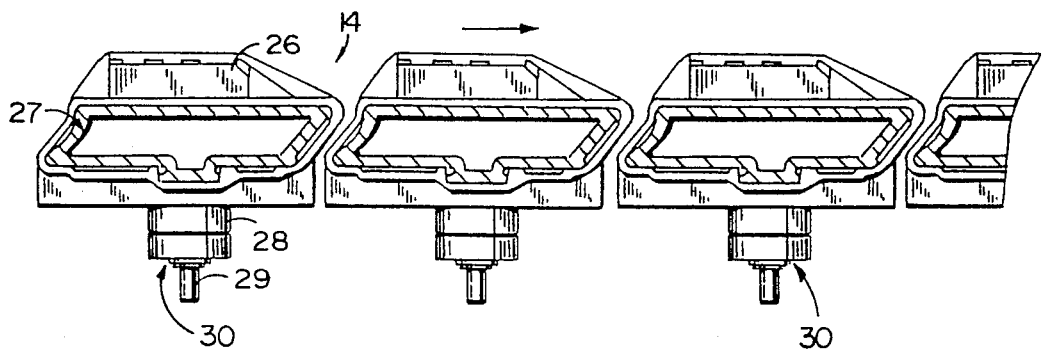
FIG. 2 is a side view of diverter members attached to the conveying surface of the conveyor in FIG. 1.
Figure 3:
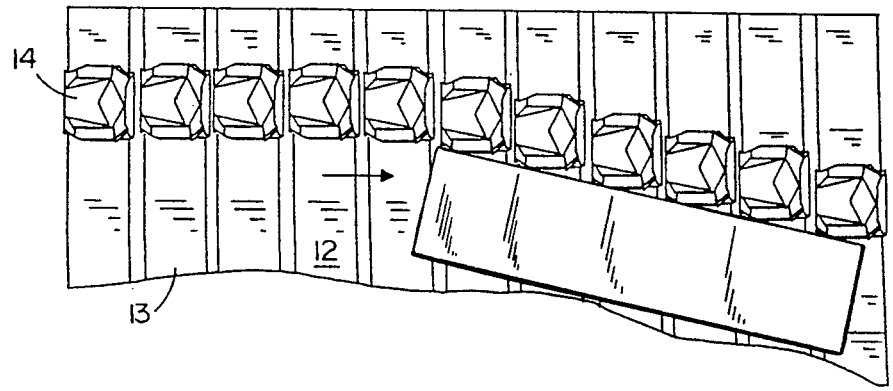
FIG. 3 is a top plan view of the conveying surface in FIG. 1 with diverting shoes, illustrating a diverting motion.

Referring now specifically to the drawings and the illustrative embodiments depicted therein, a conveyor, generally identified at 10, has side members 11, which support a powered article conveying surface 12 defined by a plurality of article supporting and transporting slats 13 extending transversely on the conveyor (FIG. 1). The ends of the slats are secured to and propelled by endless drive members, such as chains (not shown), which are recessed in the side members 11. A diverting member such as shoe assembly 14 is glideably attached to each slat 13 (FIGS. 2 and 3). Each shoe assembly includes an upper diverting member 26 which is used to contact a package being conveyed on top of the conveying surface 12. A lower supporting member 27 is attached to the upper diverting member 26 and includes a guide member 30 composed of a pin 29 and bearing 28 used to move the shoe assembly laterally along the associated slat 13. Details of the shoes and slats are more fully disclosed in commonly owned U.S. Pat. No. 5,127,510 issued to David Cotter, Bernard Woltjer and Curtis E. LeMay, entitled MODULAR DIVERTER SHOE AND SLAT CONSTRUCTION, the disclosure of which is hereby incorporated herein by reference. The movement of the diverting members provides a lateral force to displace a package on top of the conveyor slats. In FIG. 3, a package is shown being diverted to the lower right toward a sortation spur on the right side (not shown). However, conveyor 10 is capable of discharging pallets to spurs on the left side of the conveyor, or the right side of the conveyor.

Guide member 30 rides within a guide track 17 along one side of the conveyor 10 until a diverter switch 18 is actuated in response to signals from a control system (not shown). When diverter switch 18 is actuated, guide member 30 is diverted onto a diagonal track 19 which guides movement of the shoe via its bearing 28 engaging the track. Diagonal track 19 traverses diagonally to a position occupied by a pin guide, or crossover switch, assembly 40. Diverter switch 18 is disclosed more fully in commonly owned U.S. Pat. No. 5,038,912 issued to David Cotter, entitled VERTICALLY ACTUATED DIVERTING SWITCH, the disclosure of which is hereby incorporated herein by reference.

In copending application Ser. No. 07/606,504 filed Oct. 31, 1990 by David H. Cotter and Curtis E. LeMay, entitled TRACK INTERSECTION PIN GUIDE, the disclosure of which is hereby incorporated herein by reference, a crossover switch is disclosed having a integral member including a plate member pivotally mounted to pivot in the plane of the guide tracks between first and second positions. The integral member includes a pair of cam members each defining a cam surface positioned to be intercepted by a guide member traversing a given guide track, when the integral member is aligned with the opposite guide track, in order to rotate the integral member to be aligned with the guide track being traversed. The integral member further includes means defining a pair of blocking surfaces which selectively close openings in each of the guide tracks at the intersections thereof to thereby prevent a guide member from traversing the wrong guide track. The details of the crossover switch in the Cotter et al patent application will not be repeated herein.

Figure 15:
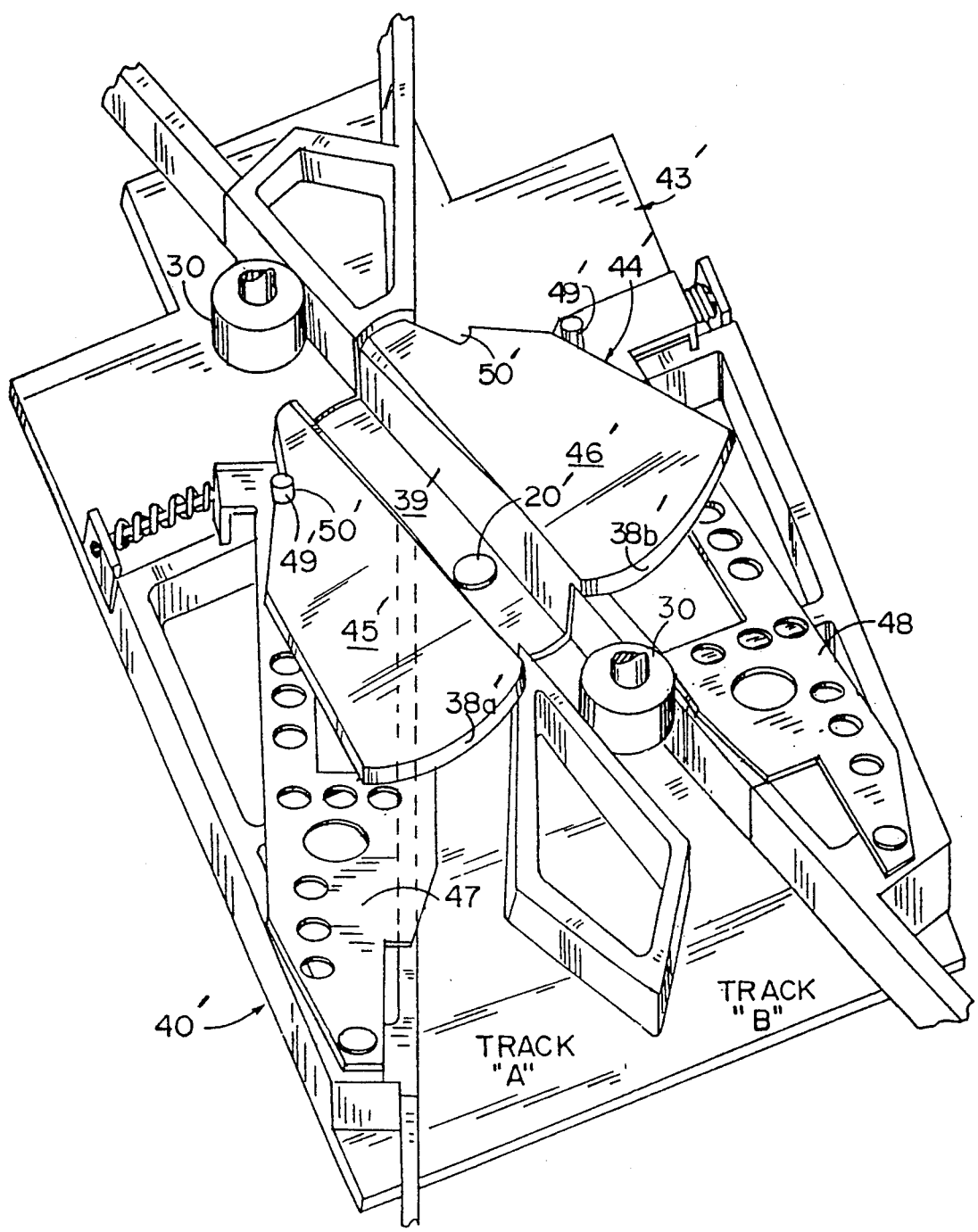
FIG. 15 is a top perspective view of an alternative embodiment of a track intersection pin guide according to the invention.

Suffice it to say, the Cotter et al patent application discloses a pin guide, or crossover switch 40', having an integral member 44' which pivots about a stud shaft bearing assembly 20' in order to selectively align blocking surfaces defining a channel 39 with one of two tracks "A" or "B" (FIG. 15). Integral member 44' includes a first cam 45' defining a cam surface 38a' which is interposed in track A when channel 39' is aligned with track B. Integral member 44' additionally includes a second cam member 46' defining a cam surface 38b' which is disposed in track B when channel 39' is aligned with track A. In this manner, when channel 39' is aligned with track B, a guide member 30 traversing track A will contact cam surface 38a' causing integral member 44' to rotate about shaft 20' and thereby align channel 39' with track A. Similarly, when channel 39' is aligned with track A, a guide member 30 traversing track B will contact cam surface 38b' rotating integral member 44' to align channel 39' with track B. Switch assembly 40' further includes a pair of vertically oriented locking pins 49' each of which selectively engages a corresponding notch 50' in the associated cam 45', 46'. A pair of actuating members 47, 48 selectively move the corresponding locking pin 49' out of the associated notch 50' in order to allow the integral member 44' to rotate to the opposite position.

In another embodiment, a switch assembly 40 includes a base member 43 and an integral member 44 which is pivotally mounted to base plate 43 by a stud shaft bearing assembly 20 (FIGS. 4–14b). Base plate 43 includes a raised central portion 52 and a pair of side walls 54, 56 which define a track "A" between side wall 54 and central portion 52 and a track "B" between central portion 52 and side wall 56. Track A includes an elongated shallow channel 58 in which a bearing 28 traverses and a coaxial elongated deep channel 60 in which pin 29 traverses. Likewise, track "B" includes an elongated shallow channel 62 in which bearings 28 traverses and a coaxial elongated deep channel 64 in which pins 29 traverse. Tracks "A" and "B" intersect at a crossover channels 66. Shallow cavities 58, 62 and deep channels 60, 64 extend beyond crossover cavity 66 but with opposite lateral orientation downstream of crossover cavity 66. Tracks "A" and "B" intersect at an angle that is double the divert angle of conveyor 10.

A stationary nose 70 affixed to base plate 43 defines, with side wall 56, the portions of shallow channel 58 and deep channel 60 downstream of crossover cavity 66. Stationary nose 70 also defines, with side wall 54, the portion of shallow channel 62 and deep channel 64 downstream of crossover cavity 66. Stationary nose 70 includes a forward portion 72 having an upper portion 74 and a wider lower portion 76. Upper portion 74 defines with side walls 54, 56 the portions of shallow channels 58, 62 downstream of crossover cavity 66. Lower portion 76 defines with side walls 54, 56 the portion of deep channel 60, 64 downstream of crossover cavity 66.

Figures 11, 12:
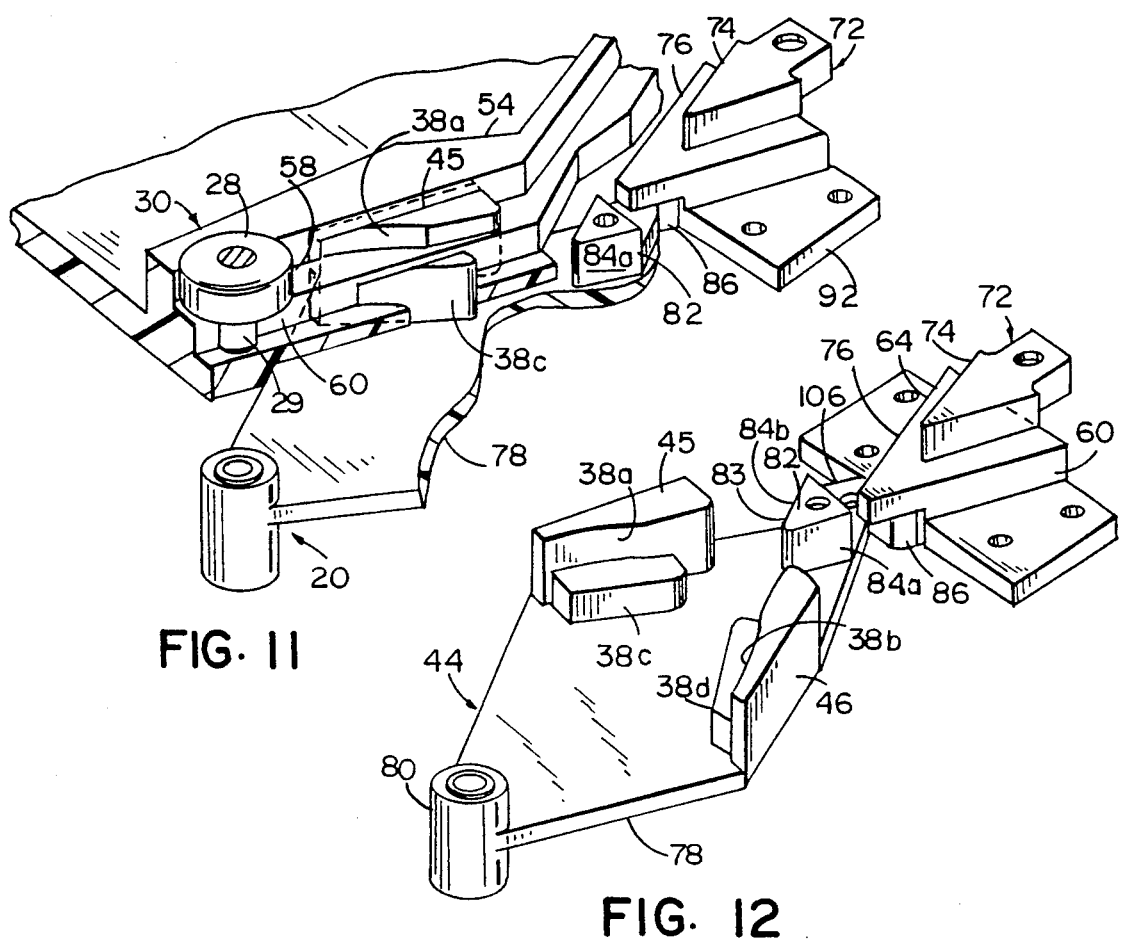
FIG. 11 is a partially sectioned perspective view of the pin guide in FIG. 4.
FIG. 12 is the same view as FIG. 11 with additional portions removed in order to reveal additional structure of the moveably integral member.

Integral member 44 includes a generally horizontal plate member 78 having a collar portion 80 defining a portion of stud shaft bearing assembly 20 (FIG. 12). Cam member 45 is integrally formed with plate member 78 and defines primary cam surface 38a, which is selectively positioned in shallow channel 58 when integral member 44 is in a front position. Cam member 45 additionally defines a secondary cam surface 38c, which is selectively positioned within deep channel 60 when integral member 44 is in the same position. Cam member 46 is also integrally formed with plate member 78 and defines a primary cam surface 38b, which is selectively positioned within shallow channel 62 when integral member 44 is in the opposite position, and a secondary cam surface 38d which is selectively positioned within deep channel 44 when integral member 44 is in such opposite position. Integral member 44 additionally includes a moveable nose member 82 rigidly affixed with plate member 78. Moveable nose 82 defines a first blocking surface 84a which is aligned with the surface of lower portion 76 defining deep channel 60 when integral member 44 is in the position illustrated in FIG. 12. Moveable nose 82 also defines a second blocking surface 84b which is aligned with the surface of lower portion 76 defining deep channel 64 when integral member 44 is in an opposite position.

Figure 9:
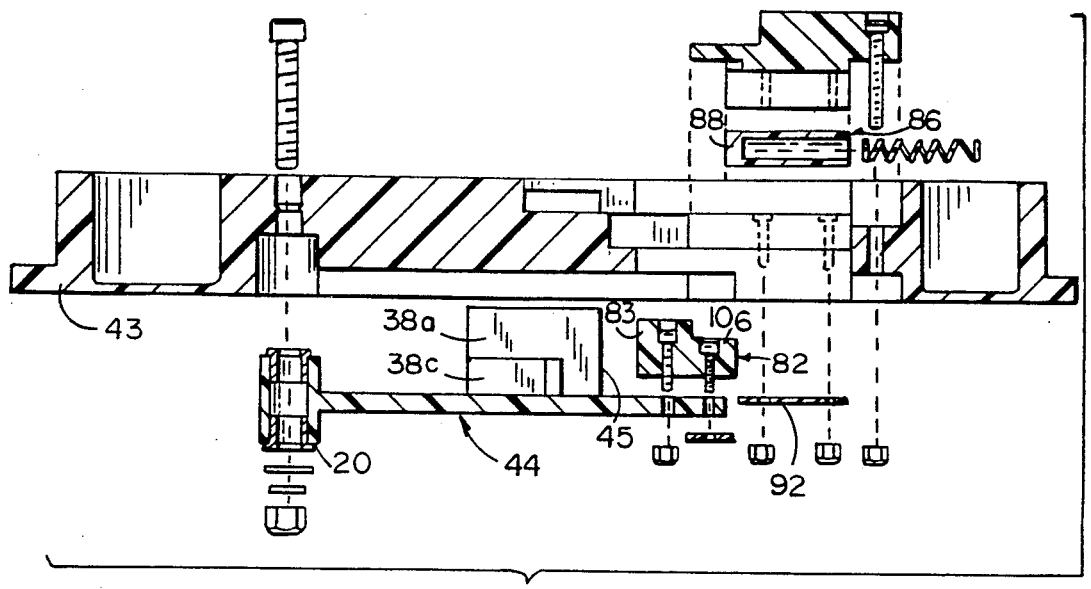
FIG. 9 is an exploded view similar to FIG. 8.
Figure 7:
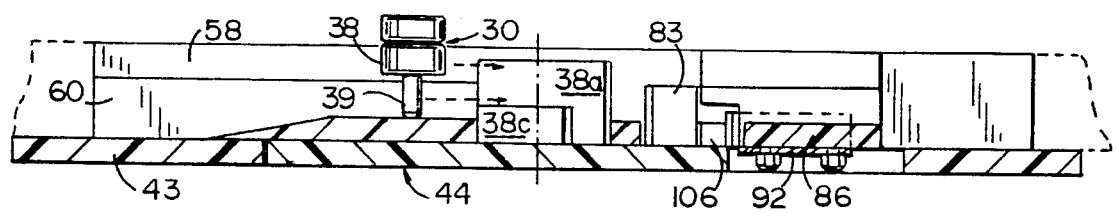
FIG. 7 is a sectional view taken along the lines VII—VII in FIG. 5.
Figure 8:
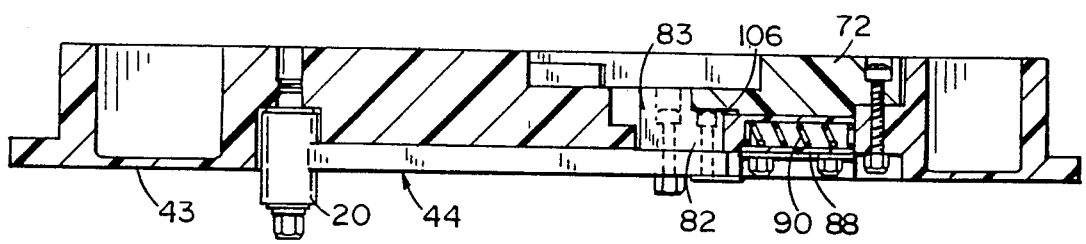
FIG. 8 is a sectional view taken along the lines VIII—VIII in FIG. 5.
Figure 6:
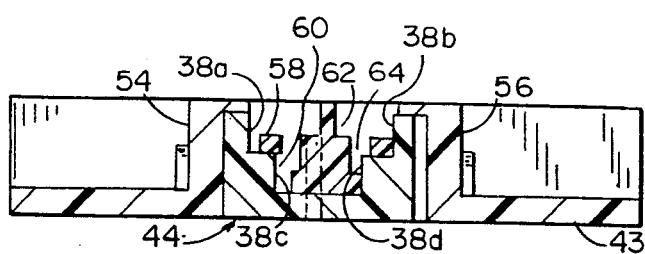
FIG. 6 is a sectional view taken along the lines VI—VI in FIG. 5.

In addition to the forward portion 83, moveable nose 82 includes a rear portion 106 which has a height which that is lower than forward portion 83. Rear portion 106 is located below lower portion 76 of stationary nose 70 and defines opposite camming surfaces 108a, 108b. The purpose of camming surfaces 108a, 108b on rear portion 106 of the moveable nose is to deflect integral member 44 into alignment with the corresponding track for guide members which may be moving upstream as a result of reverse operation of the conveying system. This is a safety feature to avoid damage to the pin guide or the shoe assembly should the conveyor be operated in reverse for maintenance purposes or for any other reason. A spring-biased detent 86 is slideably mounted to engage rear portion 106 in order to provide a light force to retain integral member 44 in its first and second positions. As best seen in FIG. 9, detent 86 includes a contact member 88, a biasing spring 90 and a plate 92 to position contact member 88 for reciprocating movement with respect to plate member 78.

Figure 10:
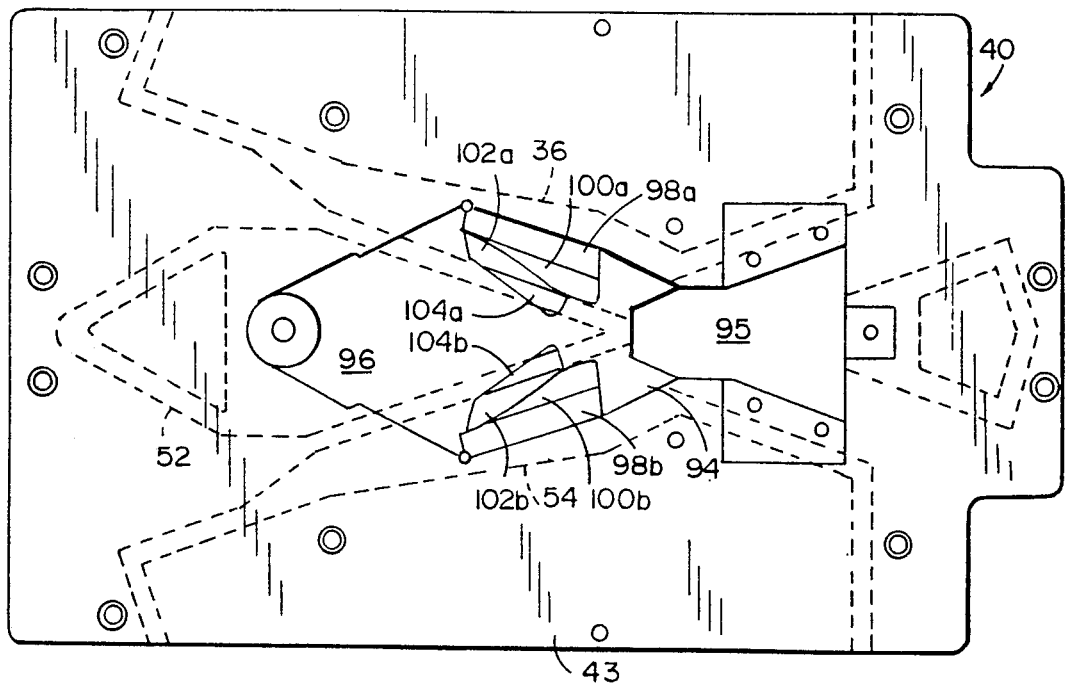
FIG. 10 is a bottom plan view of the base plate of the pin guide in FIG. 4.

As best seen in FIG. 10, base plate 43 has a central cavity 94 formed therein for receiving integral member 44. Central cavity 94 includes a cavity portion 96 having the general depth of plate member 78. Cavity 94 additionally includes a pair of cavity portions 98a, 98b which terminate to form a surface within side walls 56, 54 respectively. Central cavity 94 additionally includes cavity portions 100a, 100b which penetrate through base plate 43. Cavity portions 98a and 100a receive the portion of cam member 46 defining cam surface 38b. Cavity portions 98b and 100b receive the portion of cam member 45 defining cam surface 38a. Cavity 94 additionally includes cavity portions 102a, 102b which terminate to form a surface within side walls 56, 54, respectively, beneath channels 62, 58, respectively. Central cavity 94 additionally includes cavity portions 104a, 104b which penetrate the base plate 43. Cavity portions 102a and 104a receive the portion of cam member 46 defining cam surface 38d. Cavity portions 102b and 104b receive the portion of cam member 45 defining cam surface 38c.

Figure 13A:
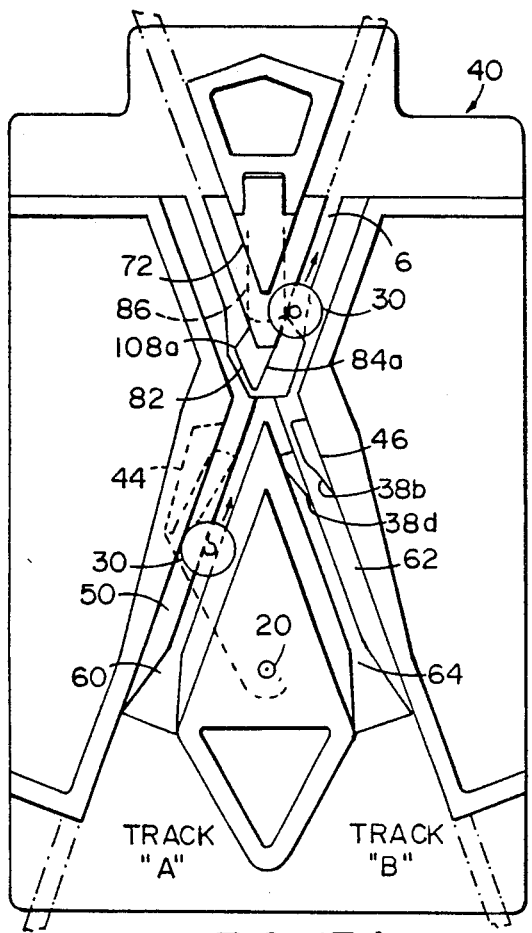
FIG. 13a is a top plan view of the pin guide in FIG. 4 illustrating movement of guide elements along a first path of travel.
Figure 13B:
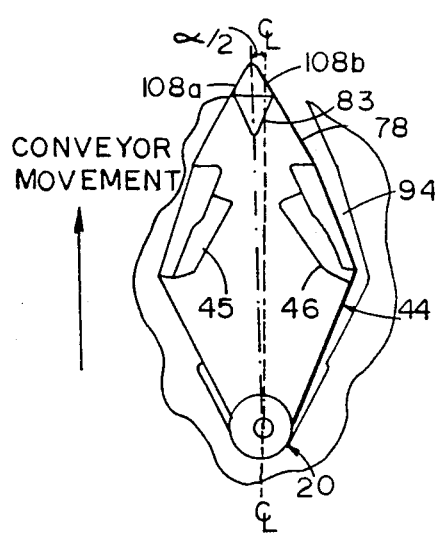

Operation of pin guide 40 is best illustrated by reference to FIGS. 13a–14b. FIG. 13a illustrates switch assembly 40 in which the integral member 44 is aligned with track "A". In this alignment, the integral member is pivoted counterclockwise as viewed from above as seen in FIG. 13b in order to align blocking surface 84a with deep channel 60. In such alignment with track "A", cam member 46 is positioned to engage guide members traversing track "B". In such orientation, primary camming surface 38b extends into shallow channel 62 where it will be engaged by a bearing 28 of a guide member 30 traversing track "B". Likewise, secondary camming surface 38d will be disposed in deep channel 64 for actuation by a pin 29 of a guide member 30. However, in practice, secondary camming surface 38d will only be actuated if a bearing 28 is missing or severely damaged. Thus, secondary camming surface 38d serves a redundant back-up role to ensure that integral member 44 will switch from the position illustrated in FIG. 13b to that illustrated in FIG. 14b in response to a guide member 30 traversing track "B". As may be seen by comparison of FIGS. 13b and 14b, movement of integral member 44 from a position aligned with track "A" to that aligned with track "B" is achieved by a clockwise rotation of the integral member about stud shaft 20 as viewed from above through an angle alpha ($\alpha$).

Figure 14A:
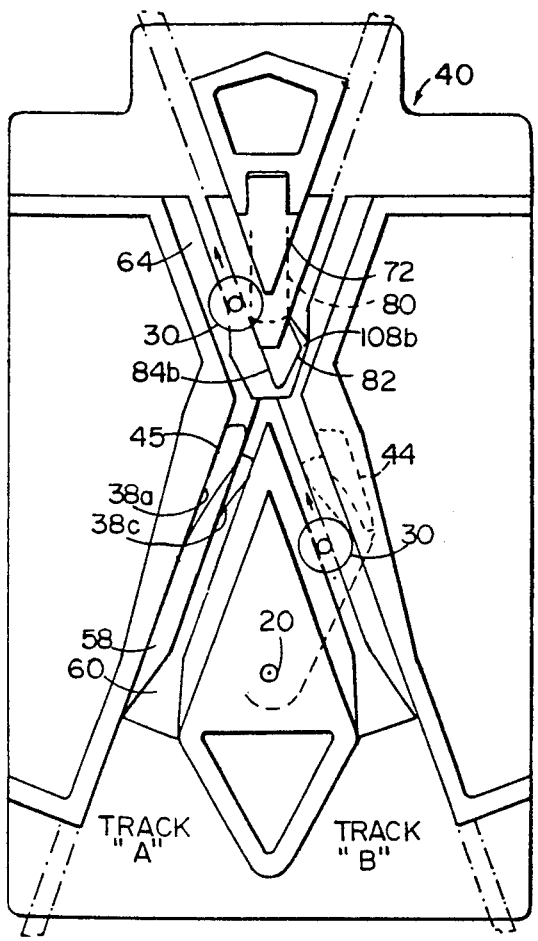
FIG. 14a is the same as FIG. 13a illustrating guide elements moving along a second pathway.
Figure 14B:
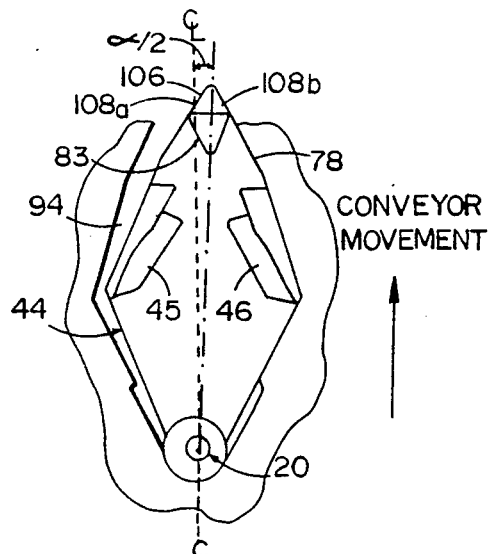

When the integral member is pivoted into alignment with track "B", as illustrated in FIGS. 14a and 14b, blocking surface 84b is aligned with deep channel 64 in order to guide pins 29 of on coming guide members 30 through crossover cavity 66. With integral member 44 in the position aligned with track "B", as illustrated in FIG. 14b, cam member 45 is rotated into position within track "A", as illustrated in FIG. 14a. In this position, primary camming surface 38a is positioned within shallow channel 58 for engagement by a bearing 28 of a guide member 30 traversing track "A". Secondary camming surface 38c is positioned within deep channel 60 for engagement by a pin 29 of a guide member 30 traversing track "A" if the bearing is missing or severely deformed When one of the cam surfaces 38a, 38c is contacted by the respective bearing or guide pin, the integral member 44 is rotated from the position illustrated in FIG. 14b to that illustrated in FIG. 13b in order to align blocking surface 84a with deep channel 60 in order to guide pins of guide members 30 through crossover cavity 66 along track "A".

Because of the particular configuration of integral member 44 including cams 45, 46, blocking surfaces 84a, 84b and stud shaft 20, integral member 44 is relatively stable in alignment with either track "A" or track "B". The purpose of detent 86 is in order to avoid rebounding of integral member 44 as it switches from one position to the other and to otherwise prevent chattering of the integral member. However, the switch assembly 40 would operate without the detent.

Figure 4:
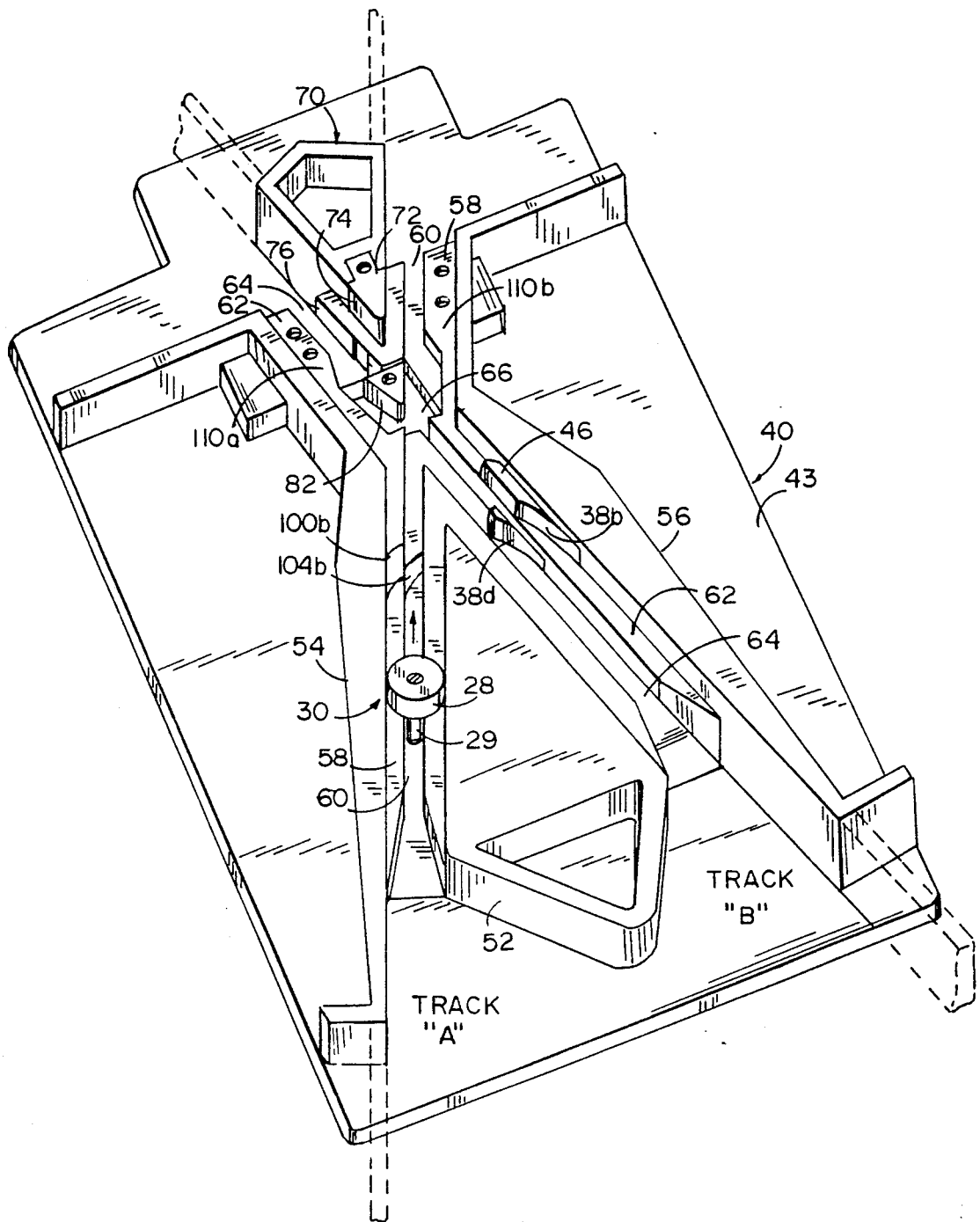
FIG. 4 is a top perspective view of a first embodiment of a track intersection pin guide according to the invention.
Figure 5:
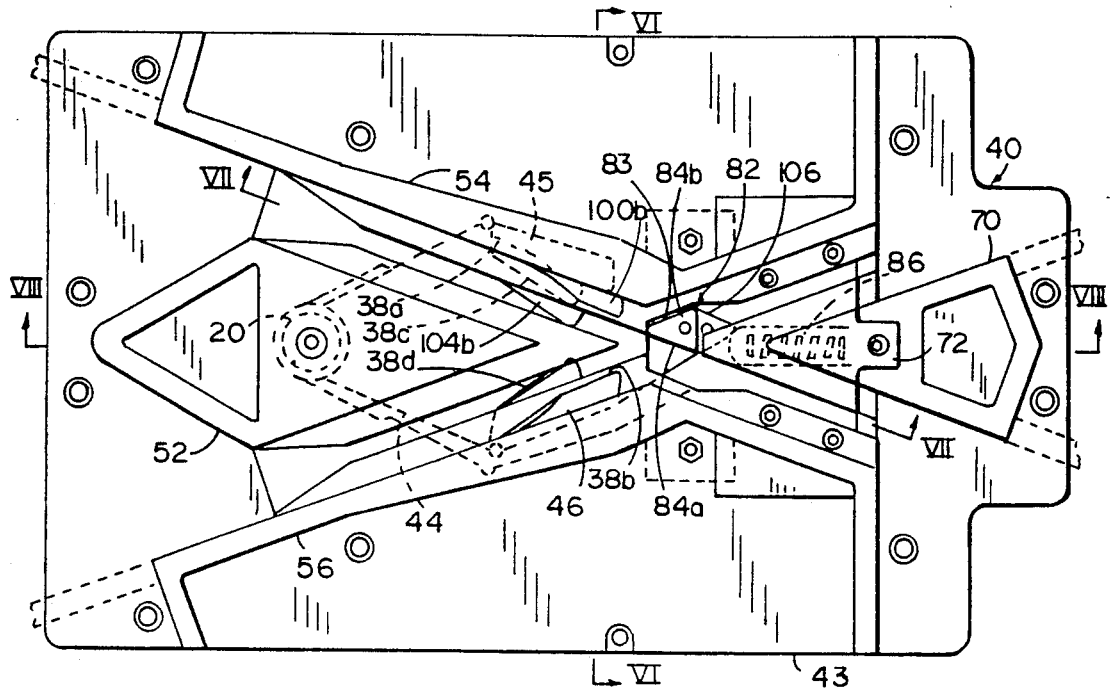
FIG. 5 is a top plan view of the pin guide in FIG. 4.

In the illustrated embodiment, base plate 43, forward portion 72 of stationary nose 70, and plate member 78 are manufactured from cast polyurethane. The advantage is that the material is light weight and is easy to manufacture into the desired shape. Such material is marketed by UNIROYAL Company under model ADIPRENE. The configuration of the disclosed embodiment accommodates manufacturer of the major components of switch assembly 40 from such material because the switch assembly reduces the stress placed on various components. Because integral member 44 moves through a small angle alpha ($\alpha$), which in the illustrated embodiment is 4.5 degrees, the member pivots at a relatively slow speed between alternate positions. Furthermore, because the cam members are actuated by the bearing surfaces which are captured within shallow channels 58 and 62, stress placed on the various components is reduced. However, in order to ensure superior wearability in the components experiencing the most stress, the moveable nose 82 and forward portion 72 of stationary nose 70 are fashioned as removable inserts which may be made from a more durable material than the remaining components. In addition, such items may be replaced if they experience wear. In the illustrated embodiment, moveable nose 82 is machined from a machinable plastic such as Delrin, or the like, which is supplied by various manufacturers. Wear elements 110a, 110b may be included in the wall portion defining deep channels 60 and 64 downstream of crossover cavity 66 (FIG. 4).

In the illustrated embodiment, tracks "A" and "B" are at a 20 degree angle with respect to the direction of movement of article conveying surface 12, which defines the divert angle of the conveyor system. Thus, it is seen, that the angle of 4.5 degrees through which integral member 44 pivots between alternate alignment with tracks "A" and "B" is significantly less than half of the divert angle of the conveyor system 10. This is accomplished by the location of the pivot, stud shaft 20, of integral member 44 upstream of the camming members 45, 46. Because nose member 82 is necessarily downstream of the camming members, this arrangement amplifies the movement of the moveable nose member 82 and, thus, ensures adequate movement through a relatively small angle. Furthermore, because the integral member is switched between positions primarily in response to movement of the bearings of the guide elements, but the diverting of the guide elements is by blocking surfaces 84a, 84b deflecting the pin portions of the guide members, superior performance is achieved in terms of reducing stress on both the crossover switch and the guide elements as well as reducing the pivot angle of integral angle 44. Furthermore, notwithstanding the positioning of the pivot point of integral member 44 upstream of the cam members and the blocking surfaces, means are provided for switching the integral member in response to guide elements that are moving upstream with respect to their normal direction of travel in order to avoid damage to the guide elements or the crossover switch.

Thus it may be seen that the present invention provides a uniquely compact, low noise and reliable crossover switch or pin guide. By combining in a single integral member both the camming surfaces, which respond to the guide elements in order to rotate an integral member, and the blocking surfaces, which direct the guide elements in their traverse along the appropriate path, the prior art necessity for complicated interconnecting rod members and the like is avoided. Furthermore, the integral member may be formed from a plastic material which further reduces noise produced by the interface of the guide members and the integral member. Additionally, the significant reduction in moving parts produces a commensurate reduction in maintenance.

Changes in modifications in the specifically described embodiments can be carried out without departing from the principals of the invention. For example, the invention may be applied to conveyor systems having divert angles which are greater than or less than 20 degrees. In addition, the base plate and integral member may each be formed from a single piece of plastic material, such as cast polyurethane, without the use of separate attached wear elements. Indeed, such totally integral components would be less expensive to manufacture and may be determined to be sufficiently durable for particular applications. Notwithstanding these and other modifications, the invention is intended to be limited only by the scope of the appended claims, as interpreted according to the principles of patent law including the doctrine of equivalence.

The embodiments of the invention in which an exclusive property or privilege is claimed are defined as follows.

1. A conveyor system comprising:
    a plurality of elongated article supporting members moving in an endless path as the conveyor is operated;
    at least one article diverter mounted to at least one of the supporting members for movement lengthwise relative thereto to divert articles along the length of said one of said supporting members as the conveyor is operated, said article diverter having a guide element;
    track means cooperating with the diverter guide element for moving the article diverter in a predetermined manner relative to said one of said supporting members as the conveyor is operated, said track means including first and second crossing guide tracks, said first guide track having a first track surface for guiding the element in a first path, said second guide track having a second track surface for guiding the guide element in a second path, said first track surface having a first opening for permitting passage therethrough of the guide element moving along said second track surface in said second path, said second track surface having a second opening for permitting passage therethrough of a guide element moving along said first track surface in said first path;

a plate member that pivots in the plane of said guide tracks between a first position guiding said guide elements along said first path as an incident of said guide element moving in said first path and a second position guiding said guide elements along said second path as an incident of said guide element moving in said second path said plate member including first and second cam members defining first and second cam surfaces, said plate member further including first and second guiding surfaces, said first cam member positioning said first cam surface in said first path for actuation by a guide element moving in said first path in order to rotate said cam surfaces and said guiding surfaces about a common pivot to said first position when said plate member is in said second position, said second cam member positioning said second cam surface in said second path for actuation by a guide element moving in said second path in order to rotate said cam surfaces and said guiding surfaces about said common pivot to said second position when said plate member is in said first position, said first guiding surface aligned with said first track surface in order to guide movement of said guide elements past said first opening when said plate member is in said first position and said second guiding surface aligned with said second track surface in order to guide movement of said guide elements past said second opening when said integral member is in said second position.

2. The conveyor system in claim 1 wherein said common pivot is upstream of said cam members with respect to travel of said guide element.

3. The conveyor system in claim 2 wherein said plate member includes means defining a third cam surface in said first path for actuation by a guide element moving in said first path in order to rotate said plate ember when said plate member is in said second position and a fourth cam surface in said second path for actuation by a element in said second path in order to rotate said plate member when said plate member is in said first position.

4. The conveyor system in claim 1 wherein said plate member pivots in an arc of less than approximately 15 degrees between said first and second positions.

5. The conveyor system in claim 4 wherein said arc is approximately 4.5 degrees.

6. The conveyor system in claim 1 wherein said guide element includes a guide bearing and a guide pin, said guide pin extending past said guide bearing, wherein said first and second cam surfaces are positioned for actuation by the guide bearing of the guide element, and wherein said first and second blocking surfaces are positioned to block said guide pin of the guide element.

7. The conveyor system in claim 6 wherein said first cam member further defines a third cam surface positioned in said first path for actuation by a guide pin of a guide element moving in said first path in order to rotate said plate member when said plate member is in said second position, and wherein said second cam member further defines a fourth cam surface positioned in said second path for actuation by a guide pin of a guide element moving in said second path in order to rotate said plate member when said plate member is in said first position.

8. A track intersection pin guide for an article sorting system having diverting members propelled by guide elements and guide tracks traversing at an intersection for guiding said guide elements through a guide track intersection, said pin guide comprising:

a base member;

a plate member generally in the plane of the guide tracks, first and second cam members extending from said plate member defining first and second cam surfaces and means defining first and second blocking surfaces extending from said plate member and adapted to guiding said guide elements through a guide track intersection; and pivot means for pivotally mounting said plate member to pivot in said plane about said base member between first and second positions to position one of said first and second blocking surfaces to guide a guide element along the corresponding one of said guide tracks in response to a guide element engaging one of said first and second cam members, said pivot means being upstream of said first and second cam surfaces with respect to travel of said guide elements.

9. The pin guide in claim 8 including means defining a third cam surface in one of said first and second paths for actuation by a guide element in order to rotate said plate member in one direction when said plate member is in one said first and second positions and a fourth cam surface in the other of said first and second paths for actuation by a guide element in order to rotate said plate member in an opposite direction when said plate member is in the other of said first and second positions.

10. The pin guide in claim 8 wherein said first and second blocking surfaces converge in an upstream direction.

11. The pin guide in claim 10 wherein said plate member pivots about said pivot means in an arc of less than approximately 15 degrees between said first and second positions.

12. The pin guide in claim 11 wherein said arc is approximately 4.5 degrees.

13. The pin guide in claim 8 wherein said plate member pivots about said pivot means in an arc of less than approximately 15 degrees between said first and second positions.

14. The pin guide in claim 13 wherein said arc is approximately 4.5 degrees.

15. A track intersection pin guide for an article sorting system having diverting members propelled by guide elements and guide tracks traversing at an intersection for guiding said guide elements through a guide track intersection, each of said guide elements having a guide bearing and a guide pin extending past said bearing, said pin guide comprising:

a base member;

means defining first and second blocking surfaces adapted to guiding said guide elements through a guide track intersection;

a plate member generally in the plane of the guide tracks, and pivot means for pivotally mounting said plate member to pivot in said plane about said base member between first and second positions to position one of said first and second blocking surfaces to guide a guide element along the corresponding one of said guide tracks in response to a guide element engaging one of said first and second cam members;

said first and second cam members extending from said plate member defining first and second cam surfaces, wherein said first and second cam surfaces are positioned for actuation by the guide bearing of the guide element to rotate said plate member between said first and second positions, and wherein said first and second blocking surfaces are positioned to block said guide pin of the guide element.

16. The pin guide in claim 15 wherein said first cam member further defines a third cam surface positioned for actuation by a guide pin of a guide element and said second cam member further defines a fourth cam surface for actuation by a guide pin of a guide element in order to rotate said plate member between said first and second positions.

17. The pin guide in claim 15 wherein said plate member pivots about an axis that is upstream of said cam members with respect to travel of said guide element.

18. The pin guide in claim 17 further including means defining a third cam surface for actuation by a guide element in order to rotate said plate member in a given direction and a fourth cam surface for actuation by a guide element in order to rotate said plate member in an opposite direction.

19. The pin guide in claim 15 wherein said plate member pivots about said pivot means in an arc of less than approximately 15 degrees between said first and second positions.

20. The pin guide in claim 19 wherein said arc is approximately 4.5 degrees.

21. A track intersection pin guide for an article sorting system having diverting members propelled by guide elements and guide tracks traversing at an intersection for guiding said guide elements through a guide track intersection, each of said guide elements having a guide bearing and a guide pin extending past said bearing, said pin guide comprising:

a base member;
means defining first and second blocking surfaces adapted to guiding said guide elements through a guide track intersection;
a plate member generally in the plane of the guide tracks, and pivot means for pivotally mounting said plate member to pivot in said plane about said base member between first and second positions to position one of said first and second blocking surfaces to guide a guide element along the corresponding one of said guide tracks in response to a guide element engaging one of said first and second cam members;

said first and second cam members extending from said plate member defining first and second cam surfaces wherein said first and second cam surfaces are positioned for actuation by the guide bearing of the guide element to rotate said plate member between said first and second positions; and wherein said first cam member further defines a third cam surface positioned for actuation by a guide pin of a guide element and said second cam member further defines a fourth cam surface for actuation by a guide pin of a guide element in order to rotate said plate member between said first and second positions.

22. The pin guide in claim 21 wherein said plate member pivots about an axis that is upstream of said cam members with respect to travel of said guide element.

23. A track intersection pin guide for an article sorting system having diverting members propelled by guide elements and guide tracks angled from the direction of movement of the sorting system defining a divert angle and traversing at an intersection for guiding said guide elements through a guide track intersection, said pin guide comprising:

a base member;
a plate member generally in the plane of the guide tracks, first and second cam members extending from said plate member defining first and second cam surfaces and means defining first and second blocking surfaces extending from said plate member and adapted to guiding said guide elements through a guide track intersection;
pivot means for pivotally mounting said plate member to pivot in said plane about said base member between first and second positions to position one of said first and second blocking surfaces to guide a guide element along the corresponding one of said guide tracks in response to a guide element engaging one of said first and second cam members; and
wherein said plate member pivots between said first and second positions through a pivot angle that is less than half of said divert angle.

24. The pin guide in claim 23 wherein said divert angle is 20 degrees and said pivot angle is approximately 4.5 degrees.

* * * * *

UNITED STATES PATENT AND TRADEMARK OFFICE
CERTIFICATE OF CORRECTION

PATENT NO. : 5,275,273
DATED : January 4, 1994
INVENTOR(S) : Frank W. Veit et al It is certified that error appears in the above-indentified patent and that said Letters Patent is hereby corrected as shown below:

Column 5, line 21;
"channels 66" should be -- cavity 66 --;
"cavities 58, 62" should be -- channels 58, 62 --;

Column 5, line 45;
"front" should be -- first --;

Column 5, line 66;
After "height" delete -- which --;

Column 7, line 11;
After "deformed" insert -- . --;

Column 7, line 16;
"guide pins" should be -- guide guide pins --;

Column 9, line 47;
"ember" should be -- member --.

Signed and Sealed this

Thirteenth Day of December, 1994

Attest:

BRUCE LEHMAN

Attesting Officer　　　Commissioner of Patents and Trademarks